US012084896B2

(12) United States Patent
Taga

(10) Patent No.: US 12,084,896 B2
(45) Date of Patent: Sep. 10, 2024

(54) VEHICULAR DOOR LOCK DEVICE

(71) Applicant: MITSUI KINZOKU ACT CORPORATION, Kanagawa (JP)

(72) Inventor: Takao Taga, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 539 days.

(21) Appl. No.: 17/442,565

(22) PCT Filed: Sep. 6, 2019

(86) PCT No.: PCT/JP2019/035281
§ 371 (c)(1),
(2) Date: Sep. 23, 2021

(87) PCT Pub. No.: WO2020/194791
PCT Pub. Date: Oct. 1, 2020

(65) Prior Publication Data

US 2022/0186532 A1 Jun. 16, 2022

(30) Foreign Application Priority Data

Mar. 27, 2019 (JP) ................................ 2019-059814

(51) Int. Cl.
*E05B 81/54* (2014.01)
*E05B 79/08* (2014.01)
(Continued)

(52) U.S. Cl.
CPC .............. *E05B 81/54* (2013.01); *E05B 79/08* (2013.01); *E05B 81/00* (2013.01); *E05B 81/16* (2013.01); *E05B 85/02* (2013.01); *H01R 43/16* (2013.01)

(58) Field of Classification Search
CPC .......... E05B 81/00; H01R 13/04; H01R 43/16
See application file for complete search history.

(56) References Cited

U.S. PATENT DOCUMENTS 11,901,661 B2 * 2/2024 Kimura .................. H01R 43/20
2020/0087953 A1 * 3/2020 Odaka ..................... E05B 81/40

FOREIGN PATENT DOCUMENTS

DE 19945674 A1 3/2000
JP H10-196182 A 7/1998
(Continued)

OTHER PUBLICATIONS

International Search Report issued in corresponding International Patent Application No. PCT/JP2019/035281, dated Nov. 19, 2019, with English translation.

*Primary Examiner* — Nathan Milakovich
(74) *Attorney, Agent, or Firm* — Rimon P.C.

(57) ABSTRACT

A vehicular door lock device includes: a housing; an electrical component that is arranged on the housing; a terminal that is electrically connected to the electrical component and made of a conductive thin plate including a connecting portion configured to connect adjacent conductive portions; and an electrical circuit related to the electrical component, the electrical circuit being formed by dividing the conductive portions from each other by shearing off the connecting portion, wherein the housing includes engagement grooves that are opened at right angles with respect to mounting portions on which the conductive portions of the terminal are mounted, the terminal includes the conductive portions and pins that are arranged at end portions of the conductive portions, bent at right angles, and configured to engage with the engagement grooves, and the pins are formed by folded portions that are obtained by folding end portions of the terminal at 180 degrees.

2 Claims, 12 Drawing Sheets

(51) Int. Cl.

| | |
|---|---|
| ***E05B 81/00*** | (2014.01) |
| ***E05B 81/16*** | (2014.01) |
| ***E05B 85/02*** | (2014.01) |
| ***H01R 43/16*** | (2006.01) |

(56) References Cited

FOREIGN PATENT DOCUMENTS

| | | | |
|---|---|---|---|
| JP | 2003-047128 | A | 2/2003 |
| JP | 2006-266027 | A | 10/2006 |
| JP | 4517914 | B2 | 8/2010 |
| JP | 5050275 | B2 | 10/2012 |
| JP | 2013-136361 | A | 7/2013 |

* cited by examiner (a)

(b)

(a)

(b)

VEHICULAR DOOR LOCK DEVICE

CROSS-REFERENCE OF RELATED APPLICATIONS

This application is the U.S. National Phase under 35 U.S.C. § 371 of International Patent Application No. PCT/JP2019/035281, filed on Sep. 6, 2019, which in turn claims the benefit of Japanese Application No. 2019-059814, filed on Mar. 27, 2019, the entire disclosures of which Applications are incorporated by reference herein.

FIELD

The present invention relates to a vehicular door lock device including a conductive terminal that is electrically connected to an electrical component housed in a housing.

BACKGROUND

Patent Literature 1 describes the following invention: in a vehicular door lock device that includes a housing (casing), an electrical component that is housed in the housing, and conductive terminals that are electrically connected to the electrical component and that include connecting portions, where the terminals connected to each other via the connecting portions are divided by shearing off the connecting portions such that an electrical circuit related to the electrical component is formed, a restriction unit is arranged in the housing so as to restrict positional deviation (movement) of the terminals with respect to the housing when the connecting portions are sheared off.

CITATION LIST

Patent Literature

Patent Literature 1: Japanese Patent No. 4517914

SUMMARY

Technical Problem

However, in the invention described in Patent Literature 1, the terminals are made of a conductive plate material with a predetermined thickness or larger in order to reliably fix the terminals to the housing. Therefore, although the restricting unit restricts the positional deviation of the terminals with respect to the housing when the connecting portions are sheared off, it is still difficult to reliably prevent the positional deviation of the terminals with respect to the housing because a large force is needed when the connecting portions are sheared off, so that costs for the terminals increase.

In view of the problems as described above, an object of the present invention is to provide a vehicular door lock device that makes it possible to easily shear off a connecting portion in a terminal, reliably mount the terminal on a housing, and reduce a cost for the terminal.

Solution to Problem

To solve the problem and achieve the object, a vehicular door lock device according to the present invention includes: a housing; an electrical component that is arranged on the housing; and a terminal that is electrically connected to the electrical component and made of a conductive thin plate including a connecting portion configured to connect adjacent conductive portions, wherein an electrical circuit related to the electrical component is formed by dividing the conductive portions from each other by shearing off the connecting portion, the housing includes engagement grooves that are opened at right angles with respect to mounting portions on which the conductive portions of the terminal are mounted, the terminal includes the conductive portions and pins that are arranged at end portions of the conductive portions, bent at right angles, and configured to engage with the engagement grooves, and the pins are formed by folded portions that are obtained by folding end portions of the terminal at 180 degrees.

Moreover, in the vehicular door lock device according to the present invention, the folded portions are obtained by folding the end portions of the terminal at 180 degrees along a longitudinal direction and include bent portions that serve as boundaries between the pins and conductive portions.

Advantageous Effects of Invention

According to the present invention, pins of a terminal that are to be engaged with engagement grooves of a housing are formed by folded portions, so that even if the terminal is made of a thinner material than that of the conventional technology, it is possible to reliably assemble the terminal onto the housing, easily shear off the connecting portion, and reduce costs for the terminal.

BRIEF DESCRIPTION OF DRAWINGS

FIG. 7(*b*) is a perspective view of the switch terminal module viewed from a back side.

FIG. 8(*b*) is a cross-sectional view cut along a line B-B in FIG. 8(*a*).

DESCRIPTION OF EMBODIMENTS

Figure 1:
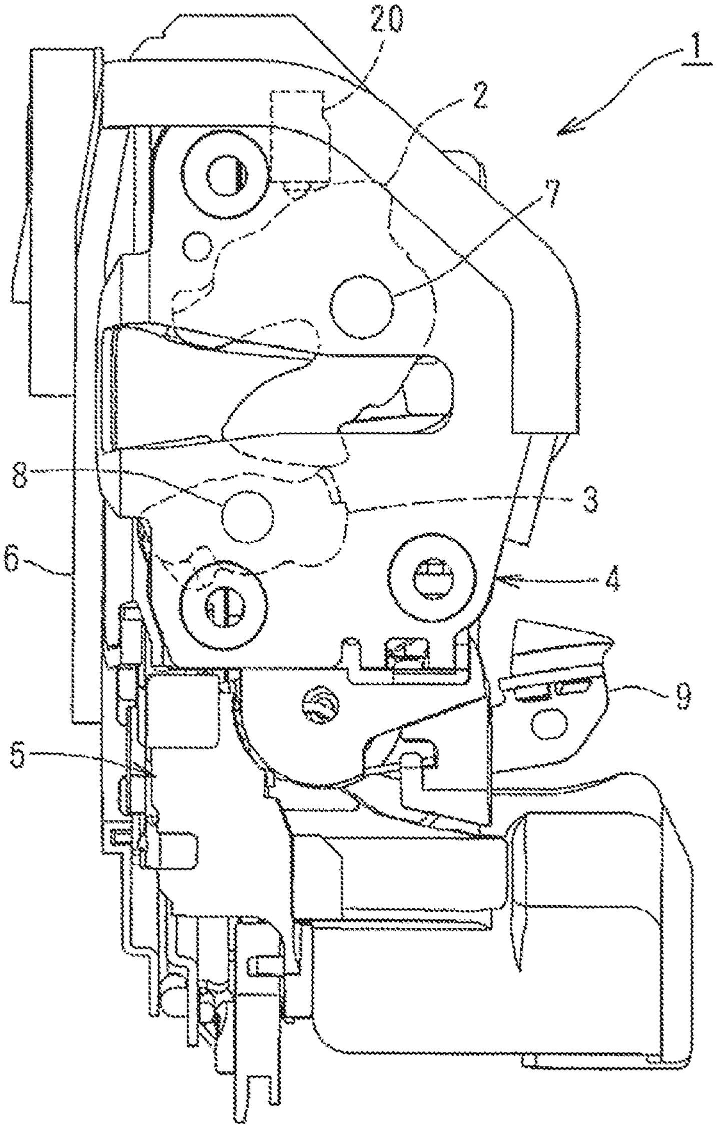
FIG. 1 is a front view of a vehicular door lock device according to the present invention.
Figure 2:
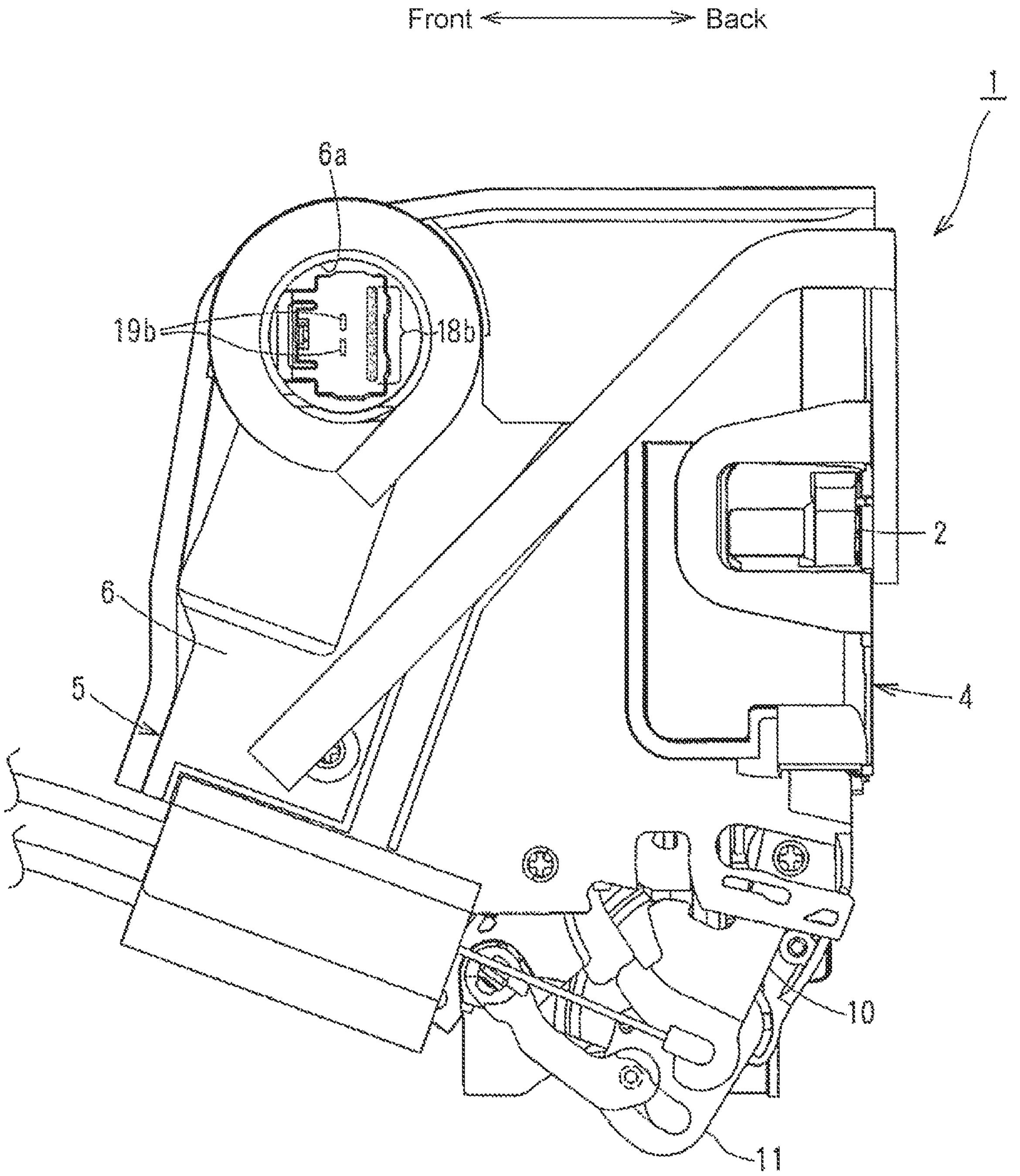
FIG. 2 is a side view of the vehicular door lock device.
Figure 3:
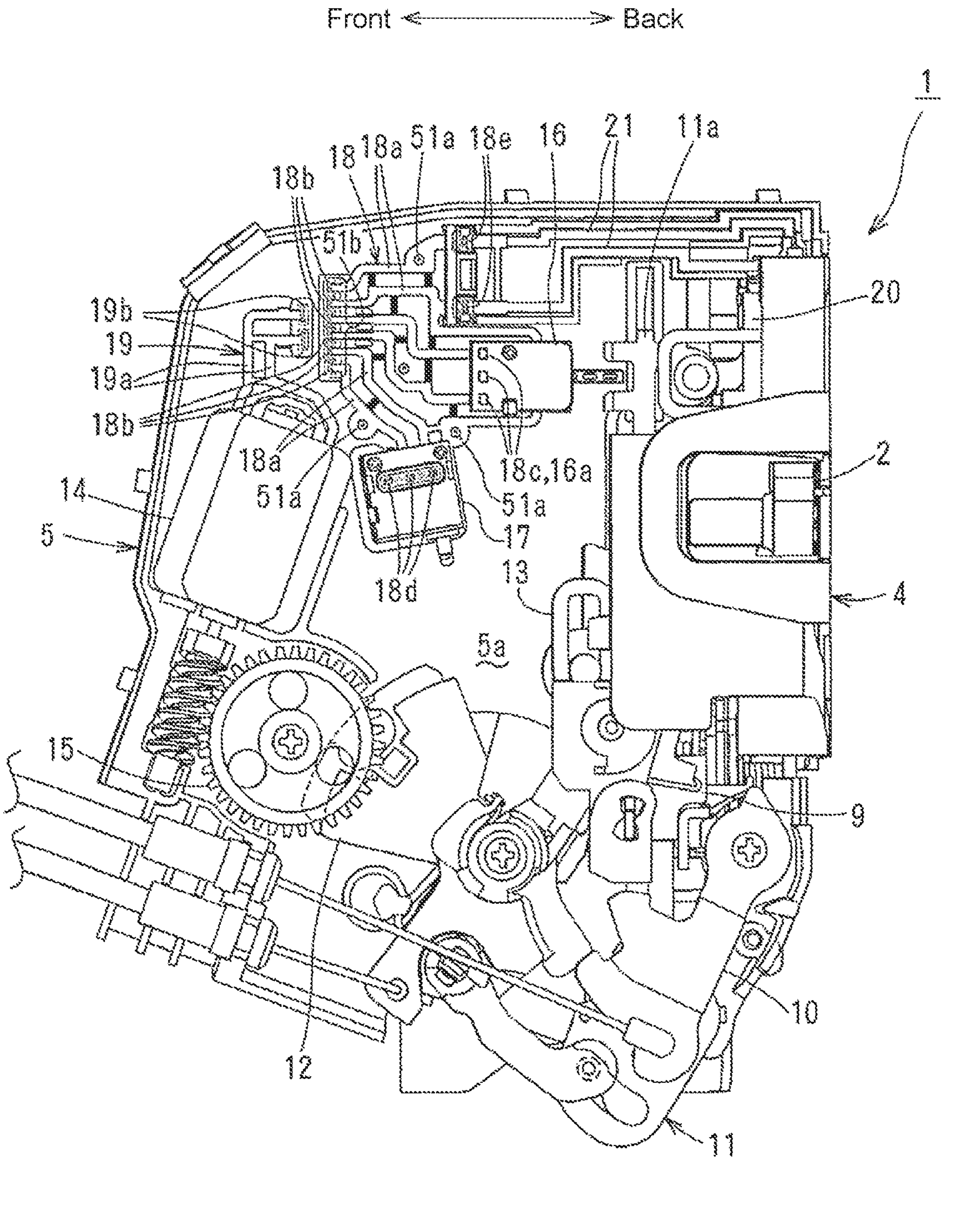
FIG. 3 is a side view illustrating an internal configuration of the vehicular door lock device.

One embodiment of the present invention will be described below based on the drawings. FIG. 1 is a front view of a vehicular door lock device 1 according to the present invention, FIG. 2 is a side view of the vehicular door lock device 1, and FIG. 3 is a side view illustrating an internal configuration of the vehicular door lock device 1. In the explanation below, directions will be described based on a vehicle. As the directions based on the vehicle, up, down, and out (that is, outside of the vehicle) are appropriately indicated by arrows in the drawings.

The vehicular door lock device 1 includes a body 4 that is fixed to an inner rear end of a front door (hereinafter, referred to as a "door") on a driver seat side of the vehicle and that includes a latch mechanism including a latch 2 and a ratchet 3 for maintaining a closed state of the door and a latch switch 20 for detecting a rotation position of the latch 2, and a housing 5 that is fixed to a front surface of the body 4, that is made of a synthetic resin, and that includes structural elements to be described later. Meanwhile, to clearly illustrate the structural elements housed in the housing 5, FIG. 3 illustrates a state in which a cover 6 that closes a side surface of the housing 5 and that forms a part of the housing 5 is omitted.

As illustrated in FIG. 1, the latch 2 is pivotally supported by a latch shaft 7 inside the body 4, and is engaged with a striker (not illustrated), which is arranged on a vehicle body side, when the door is closed. The ratchet 3 is pivotally supported by a ratchet shaft 8 inside the body 4, prevents the latch 2 from rotating to maintain the closed state of the door by being engaged with the latch 2 that is engaged with the striker, and allows the door to be opened by being disengaged from the latch 2.

As illustrated in FIG. 2, on a side surface of the cover 6, a connector jack 6*a* in which an external connector (not illustrated) that is electrically connected to an electrical wire connected to an on-vehicle battery (not illustrated), an electronic control unit (ECU) (not illustrated), or the like. When the external connector is inserted into the connector jack 6*a*, a terminal of the external connector is electrically connected to connector pins 18*b* of a switch terminal 18 (to be described later) and connector pins 19*b* of a motor terminal 19 (to be described later), where the connector pins are arranged inside the connector jack 6*a*. Accordingly, it becomes possible to supply electric power of the battery to a motor 14 that is an electrical component housed in the housing 5, and output a detection signal of a key switch 16, a lock switch 17, and the latch switch 20 that are electrical components to the ECU.

As illustrated in FIG. 3, in the housing 5, the following structural elements are arranged: an outside lever 9 that is connected to an outside handle (not illustrated) arranged on an outer side of the door for use for door opening operation; an inside lever 10 that is connected to an inside handle arranged on an inner side of the door for use for door opening operation; a key lever 11 that is connected to a key cylinder (not illustrated) arranged on the outer side of the door for use for unlock operation; a sub key lever 11*a* that moves up and down in conjunction with operation of the key lever 11; a lock mechanism (not assigned with a reference number) that is connected to the key lever 11 and includes a lock lever 12 and a lift lever 13 for allowing switching between a locked state in which the door opening operation of the outside handle is disabled and an unlocked state in which the ratchet 3 is released based on the door opening operation of the outside handle to enable the door opening operation; the motor 14 that causes the lock mechanism to switch from the locked state to the unlocked state and from the unlocked state to the locked state by a motorized force; a worm wheel 15 for transmitting power of the motor 14 to the lock lever 12; the key switch 16 for detecting operation of the key lever 11 via the sub key lever 11*a*; the lock switch 17 as an electrical component for detecting operation of the lock lever 12; the switch terminal 18 that is made of a conductive material for outputting detection signals of the key switch 16, the lock switch 17, and the latch switch 20 to the ECU; and the motor terminal 19 that is made of a conductive material for supplying electric power of the battery to the motor 14.

Meanwhile, the latch 2, the ratchet 3, the outside lever 9, the inside lever 10, the key lever 11, the sub key lever 11*a*, the lock lever 12, the lift lever 13, and the worm wheel 15 have well-known configurations and are not directly related to the present invention, and therefore detailed explanation thereof will be omitted.

Figure 4:
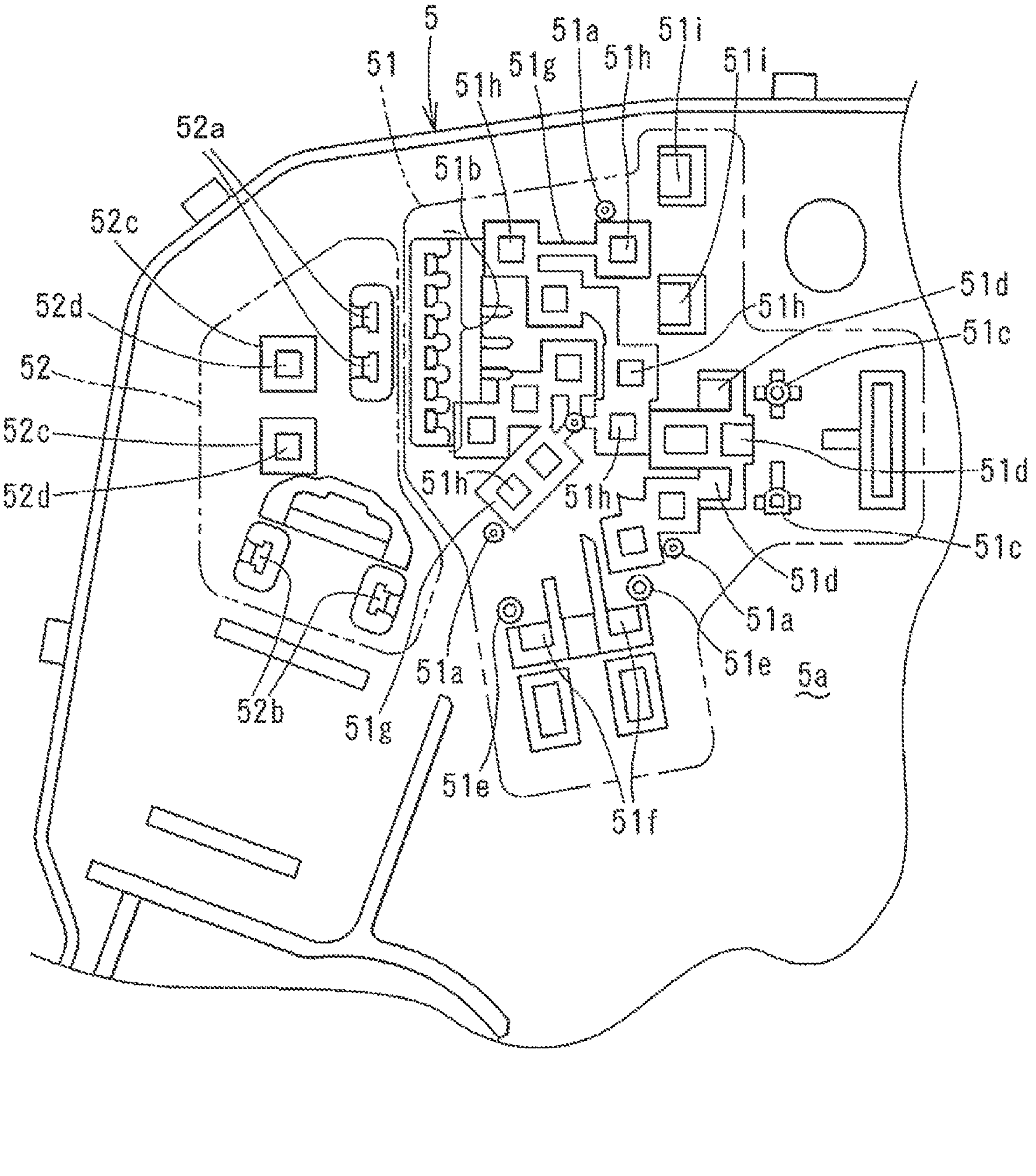
FIG. 4 is an enlarged side view of a main part of a housing.
Figure 5:
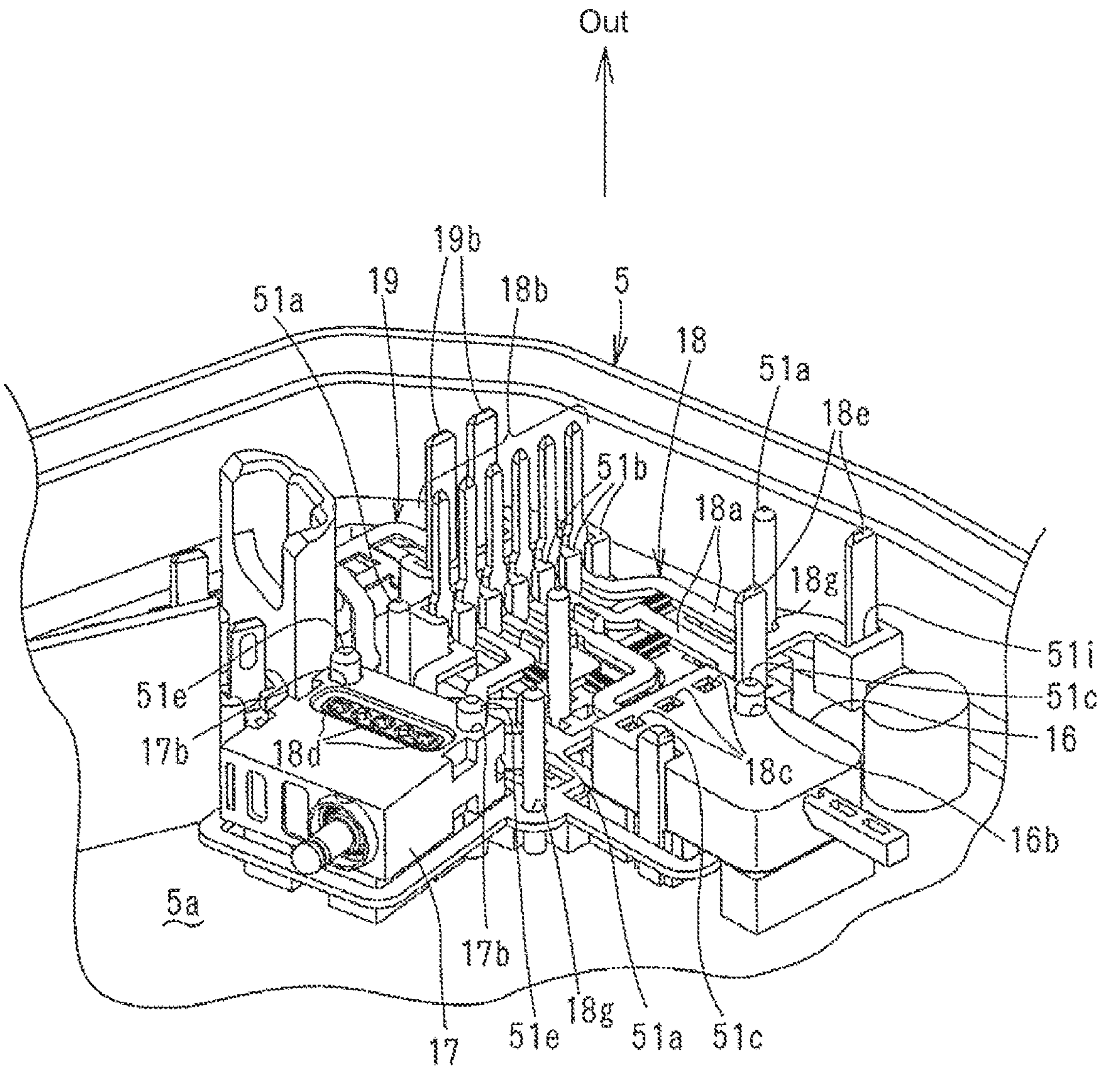
FIG. 5 is a perspective view of the main part in a state in which a switch terminal module and a motor terminal are assembled onto the housing.
Figure 6:
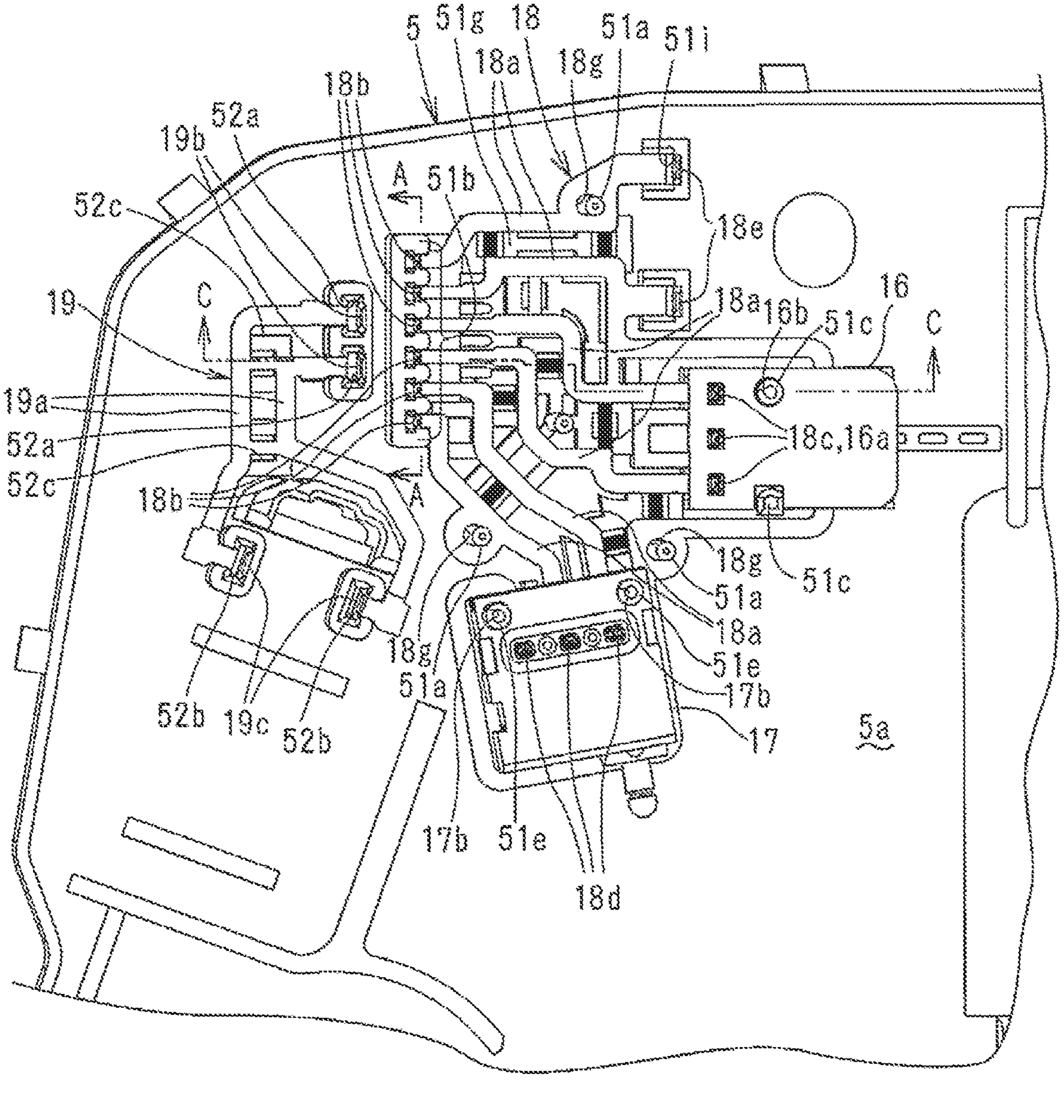
FIG. 6 is a side view of the main part in the state in which the switch terminal module and the motor terminal are assembled onto the housing.

FIG. 4 is an enlarged side view of a main part of the housing 5 in a state in which each of the terminals 18 and 19 and the electrical components are not assembled. FIG. 5 is a perspective view of the main part in a state in which each of the terminals 18 and 19 and each of the switches 16 and 17 are assembled onto housing 5. FIG. 6 is a side view of the main part in a state in which each of the terminals 18 and 19 and each of the switches 16 and 17 are assembled onto the housing 5.

As illustrated in FIG. 4, the housing 5 includes, as the main part, a first region 51 in which the key switch 16, the lock switch 17, and the switch terminal 18 are arranged, and a second region 52 in which the motor terminal 19 is arranged.

In the first region 5, the followings are arranged: a plurality of (three in the embodiment) cylindrical positioning protrusions 51*a* that protrude outward (in a forward direction in FIG. 4) at right angles with respect to an arrangement surface 5*a* (a surface on which the structural elements as described above are arranged) of the housing 5; a plurality of (six in the embodiment) connector engagement grooves 51*b* that are arranged at positions corresponding to a position of the connector jack 6*a* and that are opened to the outside in a substantially T-shaped manner; first protrusions 51*c* that protrude outward at right angles and first recesses 51*d* that are opened to the outside in an area in which the key switch 16 is to be arranged; second protrusions 51*e* that protrude outward at right angles and second recesses 51*f* that are opened to the outside in an area in which the lock switch 17 is to be arranged; mounting portions 51*g* that have certain shapes corresponding to a pattern of an electrical circuit of the switch terminal 18, that protrude outward by predetermined amounts from the arrangement surface 5*a*, and that have surfaces parallel to the arrangement surface 5*a*; a plurality of punching recesses 51*h* that are arranged inside the mounting portions 51*g*; and third recesses 51*i* that are opened to the outside.

In the second region 52, the followings are arranged: a plurality of connector engagement grooves 52*a* that are arranged at positions corresponding to the position of the connector jack 6*a* and that are opened to the outside in a substantially T-shaped manner; recesses 52*b* that are opened to the outside in an area in which the motor 14 is to be arranged; mounting portions 52*c* that protrude outward by predetermined amounts from the arrangement surface 5*a* so as to correspond to a pattern of an electrical circuit of the motor terminal 19 and that have surfaces parallel to the arrangement surface 5*a*; and a plurality of punching recesses 52*d* that are arranged in the mounting portions 52*c*.

Figure 7:
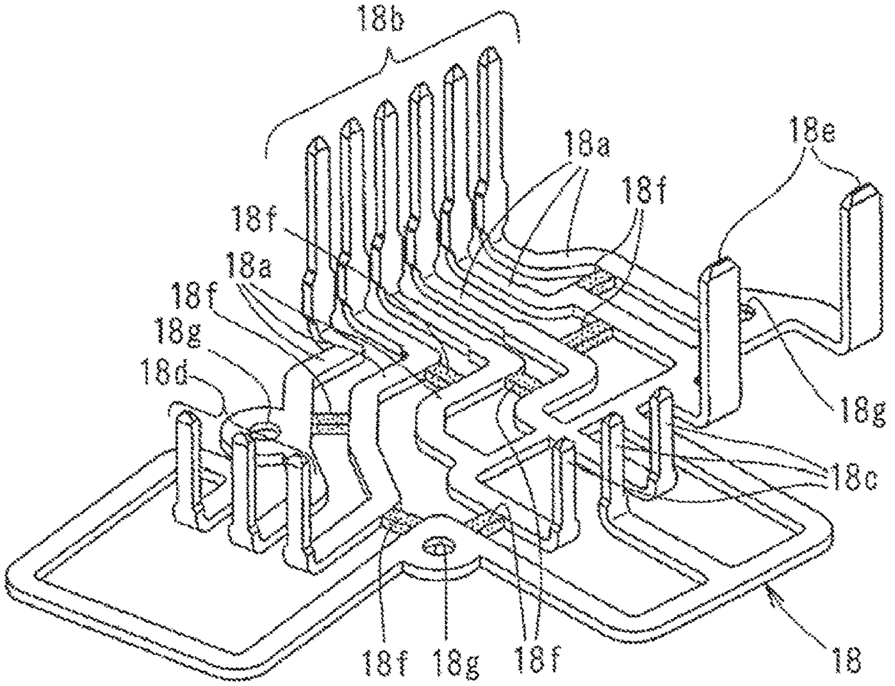
FIG. 7(*a*) is a perspective view of the switch terminal.
Figure 7:
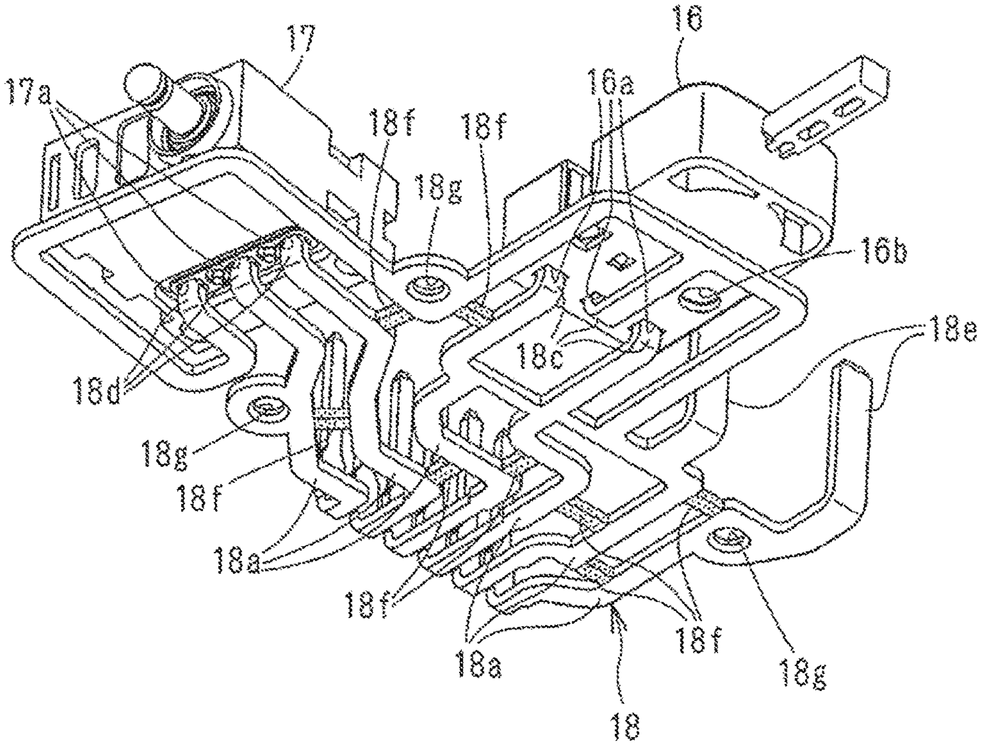
Figure 8:
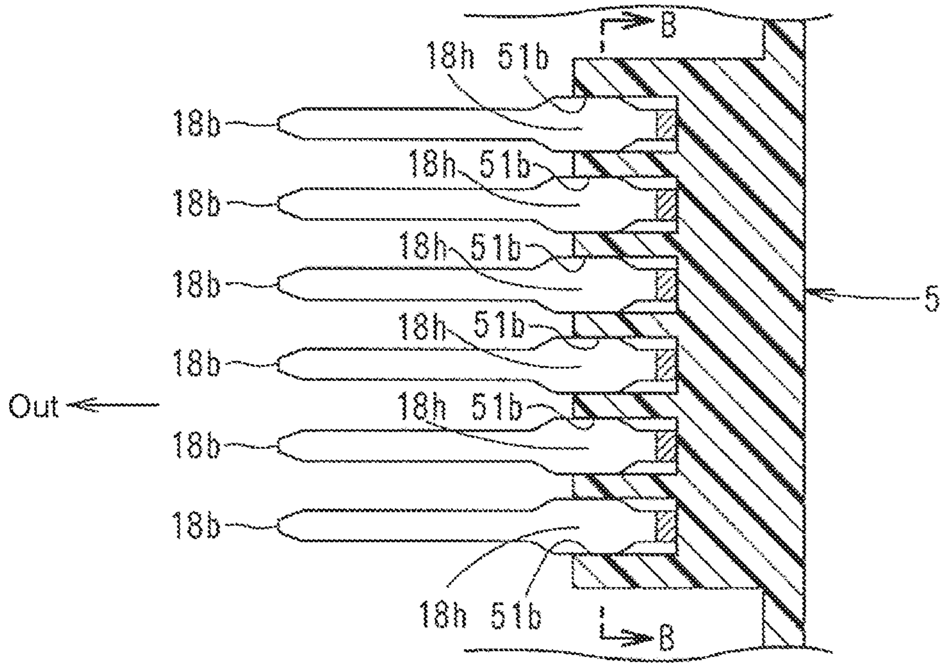
FIG. 8(*a*) is an enlarged cross-sectional view cut along a line A-A in FIG. 6.
Figure 8:
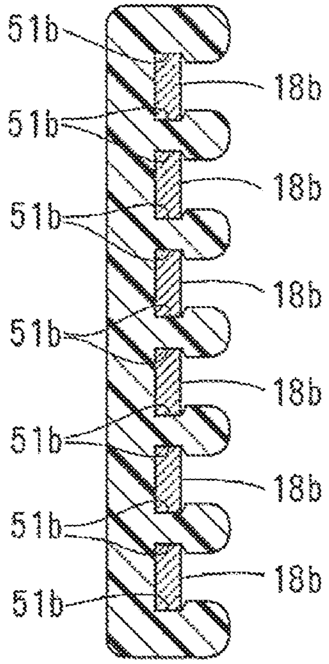
Figure 9:
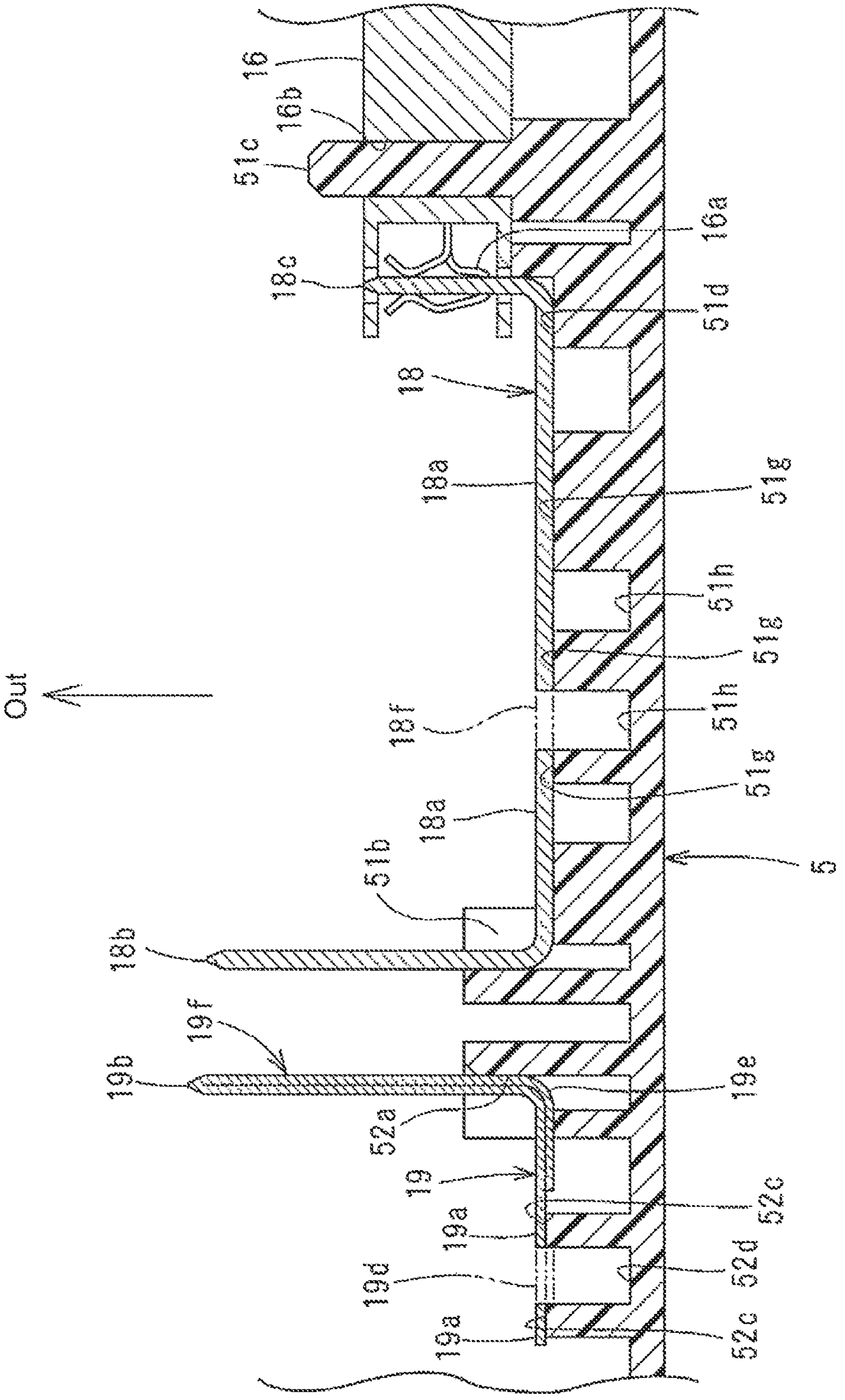
FIG. 9 is an enlarged cross-sectional view cut along a line C-C in FIG. 6.

FIG. 7(*a*) is a perspective view of the single switch terminal 18. FIG. 7(*b*) is a perspective view of a switch terminal module (a state in which the key switch 16 and the lock switch 17 are assembled onto the switch terminal 18) when viewed from back side. FIG. 8(*a*) is an enlarged cross-sectional view cut along a line A-A in FIG. 6. FIG. 8(*b*) is a cross-sectional view cut along a line B-B in FIG. 8(*a*). FIG. 9 is an enlarged cross-sectional view cut along a line C-C in FIG. 6.

As illustrated in FIG. 7(*a*) and FIG. 7(*b*), the switch terminal 18 is made of, for example, a conductive material that is a conductive thin plate with a thickness of 0.6 millimeters (mm), and includes a plurality of conductive portions 18*a* that form electrical circuits, a plurality of connector pins 18*b* that are electrically connected to an external connector, a plurality of key switch pins 18*c* that are electrically connected to the key switch 16, a plurality of lock switch pins 18*d* that are electrically connected to the lock switch 17, latch switch pins 18*e* that are electrically connected to conductive terminals 21 (see FIG. 3) that are electrically connected to the latch switch 20, a plurality of connecting portions 18*f* that connect the adjacent conductive portions 18*a*, and positioning holes 18*g* that determine a position of the switch terminal 18 when the positioning protrusions 51*a* of the housing 5 are inserted therein, where an electrical circuit related to each of the switches 16, 17, and 20 is formed when the conductive portions 18*a* are divided from each other by shearing off each of the connecting portions 18*f*.

The conductive portions 18*a* are portions that form the electrical circuits related to the key switch 16, the lock switch 17, and the latch switch 20, and are arranged inside the housing 5 in the manner of being in contact with the mounting portions 51*g* as illustrated in FIG. 9.

The connector pins 18*b* are arranged on one end portions of the conductive portions 18*a*, are bent outward at right angles with respect to the mounting portions 51*g*, and are engaged with the connector engagement grooves 51*b* in the first region 51 so as to be fixed to the housing 5 in the manner of being extended outward from the connector jack 6*a*. More preferably, as illustrated in FIG. 8(*a*), width extended portions 18*h* with large widths are formed in the connector pins 18*b*. With this configuration, in the state in which the connector pins 18*b* are engaged with the connector engagement grooves 51*b*, the width extended portions 18*h* are press fitted in the connector engagement grooves 51*b*, so that it is possible to firmly engage the connector pins 18*b* with the connector engagement grooves 51*b*. As a result, it is possible to reliably assemble the switch terminal 18 onto the housing 5.

The key switch pins 18*c* are arranged on some other end portions of the conductive portions 18*a*, are bent outward at right angles, are electrically connected to the key switch 16 by being inserted in female pins 16*a* of the key switch 16 as illustrated in FIG. 7(*b*), and are positioned with respect to the housing 5 by being engaged with the first recesses 51*d* in the first region 51 as illustrated in FIG. 9.

The lock switch pins 18*d* are arranged on some other end portions of the conductive portions 18*a* different from those used for the key switch pins 18*c*, are bent outward at right angles, are electrically connected to the lock switch 17 by being inserted in female pins 17*a* of the lock switch 17 as illustrated in FIG. 7(*b*), and are positioned with respect to the housing 5 by being engaged with the second recesses 51*f* in the first region 51.

The latch switch pins 18*e* are arranged on some other end portions of the conductive portions 18*a* different from those used for the key switch pins 18*c* and the lock switch pins 18*d*, are bent outward at right angles, are electrically connected to the latch switch 20 via the terminals 21, and are positioned with respect to the housing 5 by being engaged with the third recesses 51*i* of the first region 51.

The connecting portions 18*f* connect the adjacent conductive portions 18*a* such that the plurality of conductive portions 18*a* can be assembled onto the housing 5 simultaneously, and are sheared off by a terminal cut device 22 (to be described later) when the switch terminal module is assembled onto the housing 5, so that the adjacent conductive portions 18*a* are divided from each other and the electrical circuits of the key switch 16, the lock switch 17, and the latch switch 20 are formed.

The positioning holes 18*g* are arranged in portions adjacent to the conductive portions 18*a* located on outermost sides among the plurality of conductive portions 18*a*, and determine the position of the switch terminal 18 with respect to the housing 5 when the positioning protrusions 51*a* of the housing 5 are inserted therein. In this manner, by arranging the positioning holes 18*g* in the portions adjacent to the conductive portions 18*a* located on the outermost sides, the positioning protrusions 51*a* protruding from the positioning holes 18*g* do not disturb elevating operation of the terminal cut device 22 when the terminal cut device 22 shearing off the connecting portions 18*f*.

Meanwhile, in FIGS. 3, 5, and 6, each of the connecting portions 18*f* and 19*d* of each of the terminals 18 and 19 is colored in black, but after each of the terminals 18 and 19 is assembled onto the housing 5, each of the connecting portions 18*f* and 19*d* are not present because they are shared off.

As described above, the switch terminal 18 is reliably positioned at and assembled onto a regular position in the housing 5 by engaging the plurality of connector pins 18*b* with the plurality of connector engagement grooves 51*b* of the housing 5 in a press-fitted manner, inserting the plurality of positioning protrusions 51*a* of the housing 5 into the plurality of positioning holes 18*g*, and engaging the key switch pins 18*c* with the first recesses 51*d*, the lock switch pins 18*d* with the second recesses 51*f*, and the latch switch pins 18*e* with the third recesses 51*i* of the housing 5. In particular, the plurality of connector pins 18*b* that are electrically connected to the external connector are engaged with the plurality of connector engagement grooves 51*b* in the press-fitted manner and can reliably be fixed at regular positions, so that it is possible to reliably establish electrical connections with the external connector.

The key switch 16 includes the female pins 16*a* and an insertion hole 16*b*, is electrically connected to the switch terminal 18 when the key switch pins 18*c* of the switch terminal 18 are inserted into the female pins 16*a*, and is positioned in the housing 5 when one of the first protrusions 51*c* in the first region 51 of the housing 5 is inserted in the insertion hole 16*b*.

The lock switch 17 includes female pins 17*a* and insertion holes 17*b*, is electrically connected to the switch terminal 18 by inserting the lock switch pins 18*d* of the switch terminal 18 into the female pins 17*a*, and is positioned in the housing 5 by inserting the second protrusions 51*e* in the first region 51 of the housing 5 into the insertion holes 17*b*.

The motor terminal 19 is made of, for example, a conductive material that is a conductive thin plate with a thickness of 0.3 mm (a half of the thickness of the switch terminal 18), and includes two conductive portions 19*a*, two connector pins 19*b* that are electrically connected to an external connector, two motor pins 19*c* that are electrically connected to the motor 14, and the two connecting portions 19*d* that connect the adjacent conductive portions 19*a*, where an electrical circuit related to the motor 14 is formed when the adjacent connecting portions 19*a* are divided from each other by sharing off each of the connecting portions 19*d*.

The conductive portions 19*a* are portions that form the electrical circuit related to the motor 14, and is set in the manner of being in contact with the mounting portions 52*c* in the second region 52.

The connector pins 19*b* are arranged on one end portions of the conductive portions 19*a*, are bent outward at right angles, and are engaged with the connector engagement grooves 52*a* in the second region 52 of the housing 5 so as to be fixed to the housing 5 in the manner of being extended outward from the connector jack 6*a*.

Figure 11:
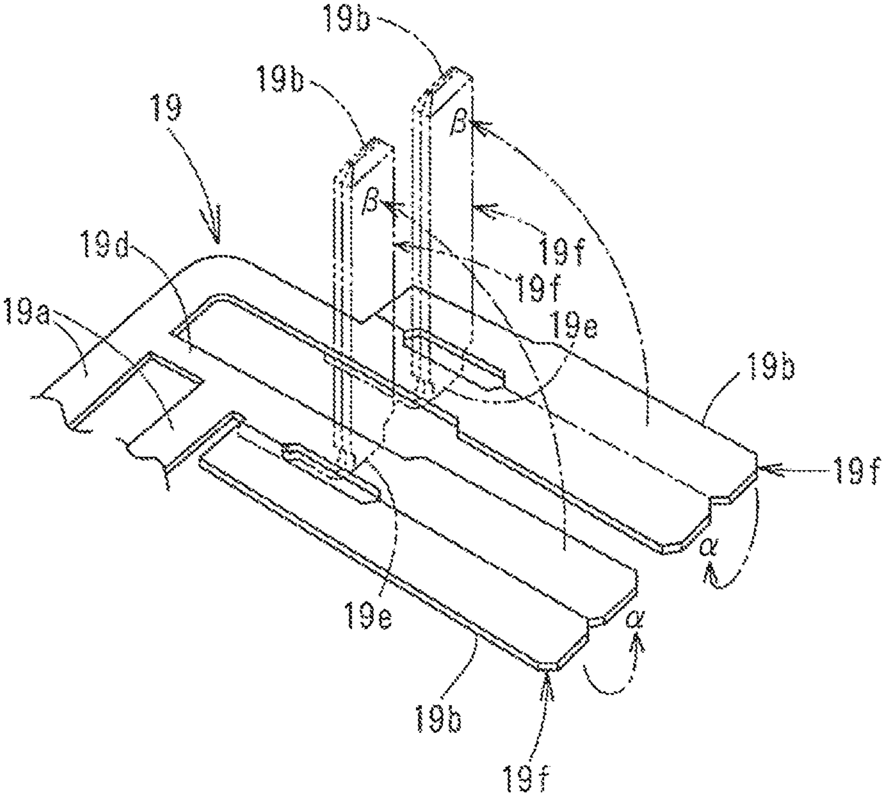
FIG. 11 is an exploded perspective view of a main part of the motor terminal.

More preferably, as illustrated in FIG. 11, the connector pins 19*b* are formed by being folded at 180 degrees in a direction of arrow a along the longitudinal direction such that folded portions 19*f* with double thicknesses are formed, and thereafter folding the folded portions 19*f* at right angles in a direction of arrow 3. As illustrated in FIG. 9, the folded portions 19*f* are formed so as to include bent portions 19*e* that serve as boundaries between the conductive portions 19*a* and the connector pins 19*b*. With this configuration, even if a thin plate with a thickness of 0.3 mm is adopted to the motor terminal 19, it is possible to set the thicknesses of the connector pins 19*b* and the bent portions 19*e* to 0.6 mm that is the same thickness as the switch terminal 18, so that it is possible to reliably fix the motor terminal 19 to the connector engagement grooves 52*a* of the housing 5. As a result, electrical connections of the connector pins 19*b* with the external connecter can reliably be established, together with the connector pins 18*b* of the switch terminal 18. Furthermore, because the motor terminal 19 is made of a material with a small thickness, it is possible to reduce costs.

A mode of assembly of the switch terminal 18 and the motor terminal 19 onto the housing 5 and a mode of shearing off of each of the connecting portions 18*f* and 19*d* will be described below with reference to FIGS. 10 and 12.

Figure 10:
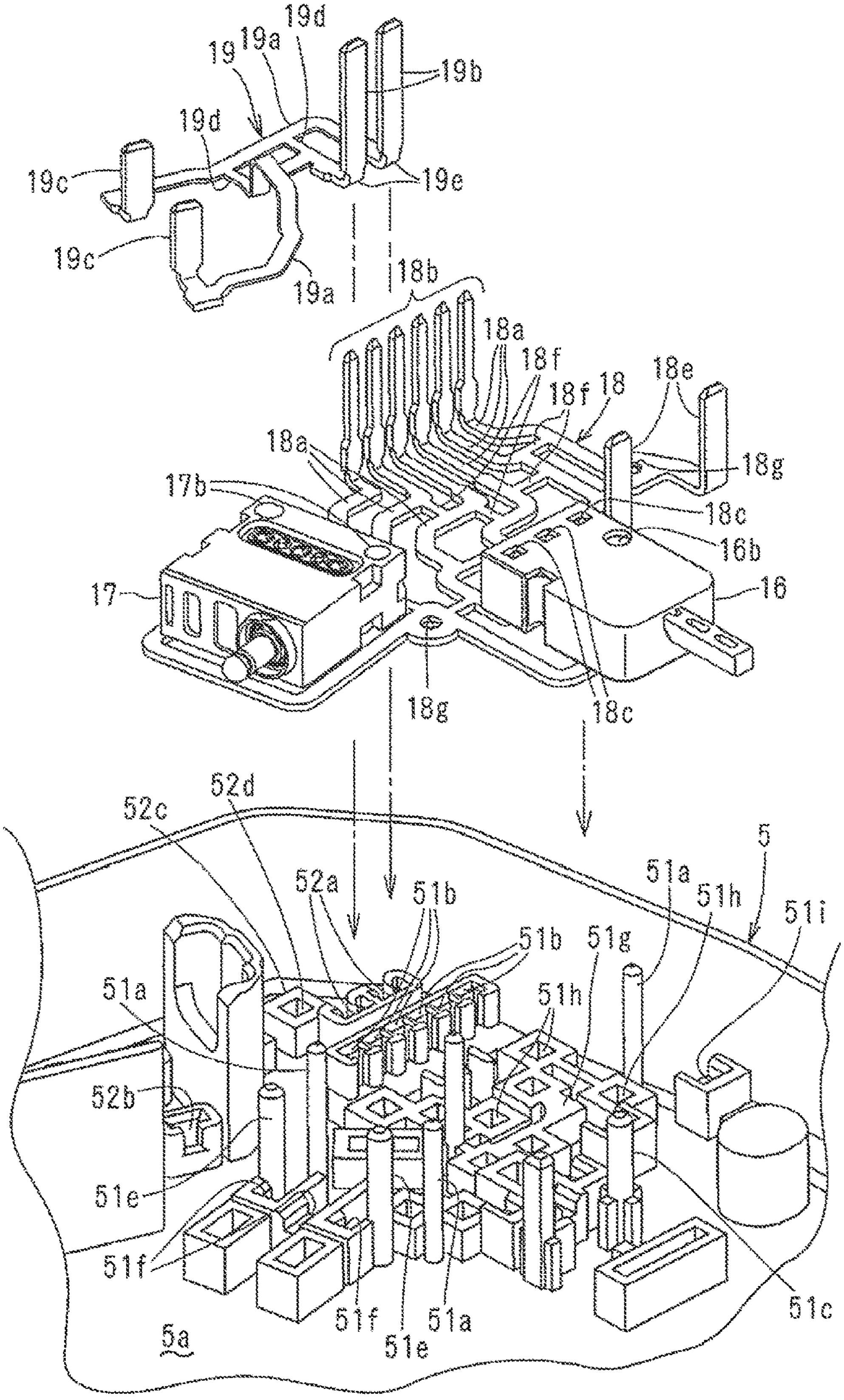
FIG. 10 is a perspective view of the main part when the switch terminal module and the motor terminal are assembled onto the housing.

First, as illustrated in FIG. 10, in the switch terminal 18, before assembly onto the housing 5, the key switch 16 and the lock switch 17 are electrically connected to the switch terminal 18 in advance, and the switch terminal module in which the key switch 16, the lock switch 17, and the switch terminal 18 are modularized is formed. The electrical connection of the key switch 16 with the switch terminal 18 is established by inserting the key switch pins 18*c* of the switch terminal 18 into the female pins 16*a* of the key switch 16. The electrical connection of the lock switch 17 with the switch terminal 18 is established by inserting the lock switch pins 18*d* of the switch terminal 18 into the female pins 17*a* of the lock switch 17.

Figure 12:
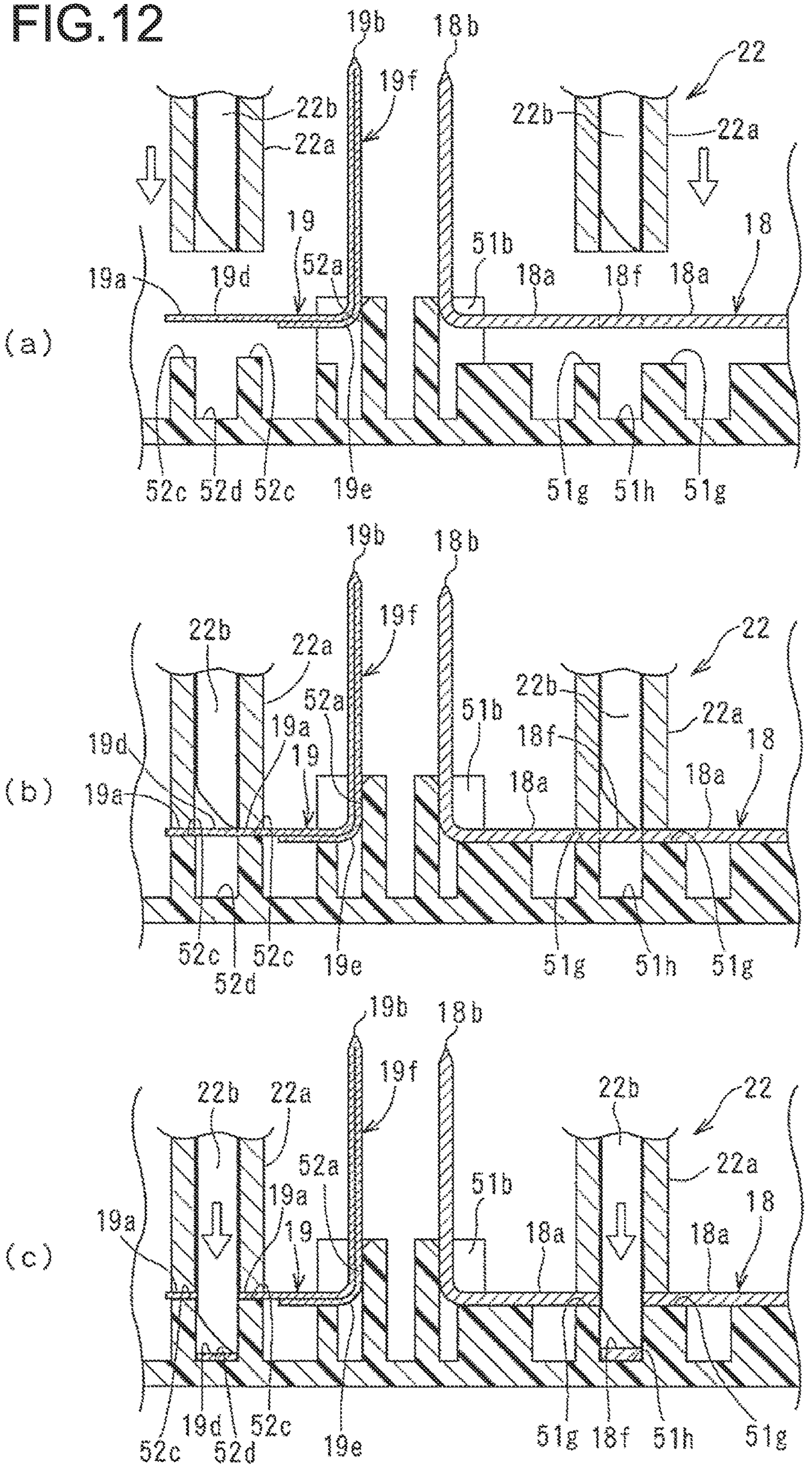
FIG. 12 is a cross-sectional view of the main part for explaining how the switch terminal module and the motor terminal are assembled onto the housing, where (a) illustrates a temporary assemble state of the switch terminal module and the motor terminal, (b) illustrates a state in which the switch terminal module and the motor terminal are pressed by an assembly device, and (c) illustrates a state in which connecting portions are sheared off.

Subsequently, as illustrated in FIG. 12(*a*), the switch terminal module is temporarily assembled onto the first region 51 of the housing 5. The temporary assembly is realized by inserting the positioning protrusions 51*a* of the housing 5 into the positioning holes 18*g* of the switch terminal 18 and lightly engaging each of the connector pins 18*b* of the switch terminal 18 with each of the connector engagement grooves 51*b* of the first region 51. Further, at the same time, one of the first protrusions 51*c* of the housing 5 is inserted into the insertion hole 16*b* of the key switch 16, and the second protrusions 51*e* of the housing 5 into the insertion holes 17*b*. Accordingly, the switch terminal module is temporarily assembled onto the housing 5.

In the motor terminal 19, each of the connector pins 19*b* is lightly engaged with each of the connector engagement grooves 52*a* in the second region 52.

Subsequently, as illustrated in FIG. 12(*b*), the switch terminal module and the motor terminal 19 that are temporarily assembled onto the housing 5 are pressed against regular assembly positions by the terminal cut device (assembly device) 22.

The terminal cut device 22 includes a plurality of tubular terminal clamps 22*a* capable of moving up and down, and punches 22*b* capable of moving up and down inside the respective terminal clamps 22*a*. In the switch terminal module, the terminal clamps 22*a* and the punches 22*b* are arranged at positions corresponding to the respective connecting portions 18*f* of the switch terminal 18. In the motor terminal 19, the terminal clamps 22*a* and the punches 22*b* are arranged at positions corresponding to the connecting portions 19*d* of the motor terminal 19.

More specifically, as can be understood from FIGS. 12(*b*) and 12(*c*), in the switch terminal module, each of the terminal clamps 22*a* is arranged such that a ring-shaped distal end surface thereof comes into contact with, across the connecting portion 18*f*, surfaces of the conductive portions 18*a* and 18*a* that are connected to each other by the connecting portion 18*f*, and the conductive portions 18*a* and 18*a* are pressed against the mounting portions 51*g*. The punch 22*b* is arranged at a position corresponding to the connecting portion 18*f* so as to be able to shear off the connecting portion 18*f* by protruding from a distal end of the terminal clamp 22*a* in a state in which the terminal clamp 22*a* presses the conductive portions 18*a* and 18*a* against the mounting portions 51*g*.

In the motor terminal 19, each of the terminal clamps 22*a* is arranged such that a ring-shaped distal end surface thereof comes into contact with, across the connecting portion 19*d*, surfaces of the conductive portions 19*a* and 19*a* that are connected to each other by the connecting portion 19*d*, and the conductive portions 19*a* and 19*a* are pressed against the mounting portions 52*c*. The punch 22*b* is arranged at a position corresponding to the connecting portion 19*d* so as to be able to shear off the connecting portions 19*d* by protruding from a distal end of the terminal clamp 22*a* in a state in which the terminal clamps 22*a* press the conductive portions 19*a* and 19*a* against the mounting portions 52*c*.

In the state in which the switch terminal module is pressed against the regular assembly position by the terminal clamps 22*a*, the positioning protrusions 51*a* of the housing 5 are completely inserted in the positioning holes 18*g* of the switch terminal 18, the connector pins 18*b* of the switch terminal 18 are completely engaged with the connector engagement grooves 51*b* in the first region 51, the conductive portions 18*a* are pressed against the mounting portions 51*g* across the punching recesses 51*h*, the connecting portions 18*f* are located above the punching recesses 51*h*, the key switch pins 18*c* are engaged with the first recesses 51*d*, the lock switch pins 18*d* are engaged with the second recesses 51*f*, and the latch switch pins 18*e* are engaged with the third recesses 51*i*.

In the motor terminal 19, the connector pins 19*b* are completely engaged with the connector engagement grooves 52*a* in the second region 52, the conductive portions 19*a* are pressed against the mounting portions 52*c* in the second region 52, the connecting portions 19*d* are located above the punching recesses 52*d* in the second region 52, and the motor pins 19*c* are engaged with the recesses 52*b* in the second region 52.

If the terminal cut device 22 further moves down from the state as illustrated in FIG. 12(*b*), as illustrated in FIG. 12(*c*), in the switch terminal module, the terminal clamps 22*a* press the conductive portions 18*a* and 18*a* against the mounting portions 51*g*, the punches 22*b* protrude from the distal ends of the terminal clamps 22*a*, and the connecting portions 18*f* are sheared off by the punches 22*b*. Accordingly, the conductive portions 18*a* are divided from each other and the electrical circuits related to the key switch 16, the lock switch 17, and the latch switch 20 are formed.

When the connecting portions 18*f* are to be sheared off, there is a risk that the position of the switch terminal 18 deviates in the conventional technology; however, such a risk is eliminated in the present embodiment, and it is possible to reliably and accurately shear off the connecting portions 18*f*. The reason for this is that the distal end surfaces of the terminal clamps 22*a* press the conductive portions 18*a* and 18*a* that are connected to each other by the connecting portions 18*f* against the mounting portions 51*g* across the connecting portions 18*f*, that the positioning protrusions 51*a* are inserted in the positioning holes 18*g*, and that the connector pins 18*b* are engaged with the connector engagement grooves 51*b*.

Furthermore, in the motor terminal 19, the conductive portions 19*a* and 19*a* that are connected to each other by the connecting portions 19*d* are pressed against the mounting portions 52*c*, the punches 22*b* protrude from the distal ends of the terminal clamps 22*a*, and the punches 22*b* shear off the connecting portions 19*d*. With this configuration, the conductive portions 19*a* are divided from each other, and the electrical circuit related to the motor 14 is formed. In this case, when the connecting portions 19*d* are to be shared off, because the thicknesses of the connecting portions 19*d* in the motor terminal 19 are 0.3 mm, which is thinner than that of the conventional technology, so that it is possible to easily shear off the connecting portions 19*d*.

After the motor terminal 19 is assembled onto the housing 5, the motor 14 is electrically connected to the motor terminal 19 by inserting female pins (not illustrated) that are arranged on a bottom surface of a housing of the motor 14 into the motor pins 19*c*.

Thus, one embodiment of the present invention has been described above. However, the present embodiment may be modified or changed in various modes as described below within the scope not departing from the gist of the present invention.

(a) In the embodiment as described above, assembly operation of the switch terminal module and assembly operation of the motor terminal 19 with respect to the housing 5 are simultaneously performed; however, the assembly operation may be performed separately.

(b) The technique of the folded portions 19*f* applied to the connector pins 19*b* of the motor terminal 19 may be applied to any of the plurality of pins of the switch terminal 18.

(c) The connecting portions 18*f* are sheared off by the punches 22*b*, and chips may be pressed into and fixed in the punching recesses 51*h* or may be removed by a removing means, such as a suction means. Further, the connecting portions 18*f* may be bent at the same time the two conductive portions 18*a* are separated from each other by shearing, and may remain connected to one of the conductive portions 18*a*. In other words, the shearing off of the connecting portions in the present application includes a case in which chips are formed and a case in which chips are not formed.

REFERENCE SIGNS LIST

1 vehicular door lock device
2 latch
3 ratchet
4 body
5 housing
5*a* arrangement surface
51 first region
51*a* positioning protrusion
51*b* connector engagement groove
51*c* first protrusion
51*d* first recess
51*e* second protrusion
51*f* second recess
51*g* mounting portion
51*h* punching recess
51*i* third recess
52 second region
52*a* connector engagement groove
52*b* recess
52*c* mounting portion
52*d* punching recess
6 cover
6*a* connector jack
7 latch shaft
8 ratchet shaft
9 outside lever
10 inside lever
11 key lever
11*a* sub key lever
12 lock lever
13 lift lever
14 motor (electrical component)
15 worm wheel
16 key switch (electrical component)
16*a* female pin
16*b* insertion hole
17 lock switch (electrical component)
17*a* female pin
17*b* insertion hole
18 switch terminal
18*a* conductive portion
18*b* connector pin
18*c* key switch pins (electrical component pin)
18*d* lock switch pin (electrical component pin)
18*e* latch switch pin (electrical component pin)
18*f* connecting portion
18*g* positioning holes
18*h* width extended portion
19 motor terminal
19*a* conductive portion
19*b* connector pin
19*c* motor pin (electrical component pin)
19*d* connecting portion
19*e* bent portion
19*f* folded portion
20 latch switch
21 terminal
22 terminal cut device (assembly device)
22*a* terminal clamp
22*b* punch

The invention claimed is:

1. A vehicular door lock device comprising:

a housing;

an electrical component that is arranged on the housing;

a terminal that is electrically connected to the electrical component and made of a conductive thin plate including a connecting portion configured to connect adjacent conductive portions; and an electrical circuit related to the electrical component, the electrical circuit being formed by dividing the conductive portions from each other by shearing off the connecting portion, wherein the housing includes engagement grooves that are opened at right angles with respect to mounting portions on which the conductive portions of the terminal are mounted, the terminal includes the conductive portions and pins that are arranged at end portions of the conductive portions, bent at right angles, and configured to engage with the engagement grooves, and the pins are formed by folded portions that are obtained by folding end portions of the terminal at 180 degrees.

2. The vehicular door lock device according to claim 1, wherein the folded portions are obtained by folding the end portions of the terminal at 180 degrees along a longitudinal direction and include bent portions that serve as boundaries between the pins and conductive portions.

* * * * *